(12) United States Patent
Massard (10) Patent No.: US 9,494,790 B1
(45) Date of Patent: Nov. 15, 2016

(54) ELECTROWETTING ELEMENT AND FLUID

(71) Applicant: Amazon Technologies, Inc., Seattle, WA (US)

(72) Inventor: Romaric Mathieu Massard, Eindhoven (NL)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/500,610

(22) Filed: Sep. 29, 2014

(51) Int. Cl.
*G02B 26/00* (2006.01)
*G02F 1/03* (2006.01)

(52) U.S. Cl.
CPC .................................. *G02B 26/005* (2013.01)

(58) Field of Classification Search
CPC ............ G02F 1/133; G02F 1/29; G02F 1/01; G02F 1/03; G02F 1/15; G02F 1/155; G02F 1/153; G02B 5/23; G02B 26/00; G02B 26/08; G02B 1/06
USPC ........ 359/290–293, 295, 315–316, 276, 238, 359/245, 242, 259, 244, 253–254, 265–275, 359/665–667, 223–225, 243, 260–263; 349/33; 252/586
See application file for complete search history.

(56) References Cited

U.S. PATENT DOCUMENTS

| 8,547,623 | B2 | 10/2013 | Parry-Jones et al. |
| 8,743,450 | B2 | 6/2014 | Massard et al. |
| 9,279,908 | B2 * | 3/2016 | Nagahara ................. G02B 1/06 |
| 2008/0130087 | A1 * | 6/2008 | Miyata et al. ................ 359/267 |
| 2009/0059348 | A1 * | 3/2009 | Niwano et al. ............... 359/296 |
| 2011/0096388 | A1 * | 4/2011 | Agrawal et al. .............. 359/268 |
| 2013/0278987 | A1 * | 10/2013 | Sheng et al. .................. 359/238 |

FOREIGN PATENT DOCUMENTS

| WO | 2007113637 A1 | 10/2007 |
| WO | 2011157826 A1 | 12/2011 |

OTHER PUBLICATIONS

V. Augugliaro, et al., "Partial Photocatalytic Oxidation of Glycerol in TiO2 Water Suspensions", Elsevier, Catalysis Today 151 (2010), pp. 21-28.
Akira Fujishima, et al., "Titanium Dioxide Photocatalysis", Elsevier, Journal of Photochemistry and Photobiology C: Photochemistry Reviews 1 (2000), pp. 1-21.
"Opinion of the Scientific Committee on Cosmetic Products and Non-Food Products Intended for Consumers", SCCNFP/0005198, Oct. 24, 2000, pp. 1-38.
Shaozheng Hu, et al., "Preparation of SiO2-Coated TiO2 Composite Materials with Enhanced Photocatalytic Activity Under UV Light", Bull. Korean Chem. Soc. 2012, vol. 33, No. 6, 1895, pp. 1-5.

(Continued)

*Primary Examiner* — Dawayne A Pinkney
(74) *Attorney, Agent, or Firm* — EIP US LLP (57) ABSTRACT

A fluid for an electrowetting element includes a dispersion of a plurality of solid particles in a liquid vehicle. Respective ones of the plurality of solid particles each include a solid core having a coating comprising silicon dioxide.

21 Claims, 3 Drawing Sheets

(56) References Cited

OTHER PUBLICATIONS

H.S. Lee, et al>, "TiO2—SiO2 Nanoparticles for Suppressing Photcatalytic Activities and Improving Hydrophilicity", Journal of Ceramic Processing Research, vol. 13, Special. 2, 2012, pp. 300-303.

Kim HJ, et al., "Dispersion Characteristics of TiO2 Particles coated with the SiO2 Nanofilm by Atomic Layer Deposition", J Nanosci Nanotechnol., Dec. 2011, http://www.ncbi.nlm.nih.gov/pubmed/22408908, p. 1.

Robert Sabia, et al., "Surface Chemistry of SiO2 and Tio2—SiO2 Glasses as Determined by Titration of Soot Particles", Journal of Non-Crystalline Solids 277 (2009), pp. 1-9.

* cited by examiner

ELECTROWETTING ELEMENT AND FLUID

BACKGROUND

Known electrowetting display devices include a reflective fluid for use in providing reflective display effects.

It is desirable to devise new compositions of such reflective fluids.

DETAILED DESCRIPTION

Figure 1:
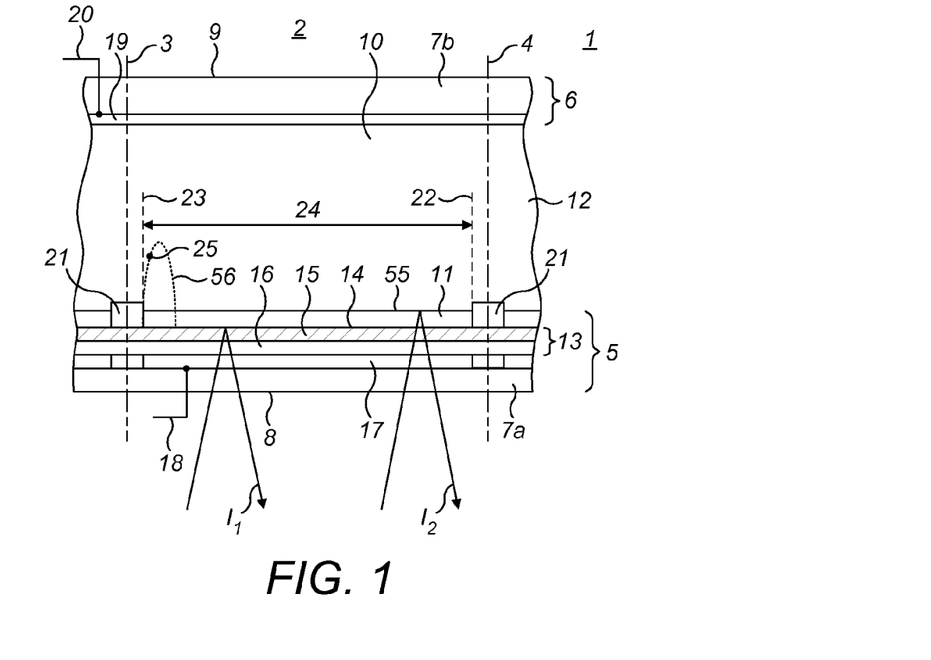
FIG. 1 shows schematically an example electrowetting display element.

FIG. 1 shows a diagrammatic cross-section of part of an example of an electrowetting display device 1, including a plurality of picture elements or display elements 2, one of which is shown in the Figure and which may also be referred to as an electrowetting cell, an electrowetting element or an electrowetting pixel. The lateral extent of the display element is indicated in the Figure by two dashed lines 3, 4. The display elements comprise a first support plate 5 and a second support plate 6. The support plates may be separate parts of each display element, but the support plates may be shared in common by the plurality of display elements. The support plates may include a glass or polymer substrate 7a, 7b and may be rigid or flexible.

The display device has a viewing side 8 on which an image or display formed by the display device can be viewed and a rear side 9. In the Figure a surface of the first support plate 5, which surface is in this example a surface of the substrate 7a, defines the viewing side 8; a surface of the second support plate 6, which surface is in this example a surface of the substrate 7b, defines the rear side 9. In examples described herein, the display device is of the reflective type, given reflective properties of the second fluid which will be explained in further detail below. In other examples, depending on the composition of the second fluid, the display device may have transmissive or transflective properties. The display device may be an active matrix driven display device. The plurality of display elements may be monochrome. For a colour display device the display elements may be divided in groups, each group having a different colour; alternatively, an individual display element may be able to show different colours.

A space 10 of each display element between the support plates is filled with two fluids: a first fluid 11 and a second fluid 12 at least one of which may be a liquid. The second fluid is immiscible with the first fluid. Therefore, the first fluid and the second fluid do not substantially mix with each other and in some examples do not mix with each other to any degree. The immiscibility of the first and second fluids is due to the properties of the first and second fluids, for example their chemical compositions; the first and second fluids tend to remain separated from each other, therefore tending not to mix together to form a homogeneous mixture of the first and second fluids. Due to this immiscibility, the first and second fluids meet each other at an interface labelled 55 in FIG. 1 for when no voltage is applied and labelled 56 for when a voltage is applied, which interface defines a boundary between the volume of the first fluid and the volume of the second fluid; this interface or boundary may be referred to as a meniscus. With the first and second fluids substantially not mixing with each other, it is envisaged in some examples that there may be some degree of mixing of the first and second fluids, but that this is considered negligible in that the majority of the volume of first fluid is not mixed with the majority of the volume of the second fluid.

Further details of the second fluid will be explained further below. The first fluid, which is electrically non-conductive, and which may be non-polar, may for example be an alkane like decane or hexadecane, silicone oil or decalin (otherwise known as bicyclo-4,4,0-decane).

The first fluid may absorb at least a part of the optical spectrum. The first fluid may be transmissive for a part of the optical spectrum, forming a colour filter. For this purpose the first fluid may be coloured by addition of pigment particles or a dye. Alternatively, the first fluid may be black, i.e. absorb substantially all parts of the optical spectrum.

The support plate 5 includes a layer with a surface for adjoinment by a fluid such as the first fluid described herein. In examples described herein, the layer is an insulating layer 13. The insulating layer may be transparent, for example fully transparent, i.e. transmissive, or partially reflective and partially transparent. The insulating layer 13 may extend between walls of a display element. To avoid short circuits between the second fluid 12 and electrodes arranged under the insulating layer, layers of the insulating layer may extend uninterrupted over a plurality of display elements 2, as shown in the Figure. The insulating layer has a surface 14 facing, i.e. closest to, the space 10 of the display element 2. An extent of the surface corresponding to the extent of the display area described below is referred to herein as the first surface and is in this example hydrophobic. The thickness of the insulating layer may be less than 2 micrometers and may be less than 1 micrometer.

The insulating layer in examples described herein is for example formed of a layer 15 which is for example formed of a hydrophobic material such as Teflon AF1600® and a barrier layer 16 with predetermined dielectric properties, the layer 15 facing, i.e. being closer to, the space 10, as shown in the Figure. The barrier layer 16 may have a thickness, taken in a direction perpendicular the plane of the substrate, between 50 nanometers and 500 nanometers and may be made of an inorganic material like silicon oxide or silicon nitride.

In the absence of an applied voltage, the hydrophobic character of the surface of the layer 15 causes the first fluid 11 to adhere preferentially to the surface 14 of the insulating layer 13, since the first fluid has a higher wettability with respect to the surface of the insulating layer 13 than the second fluid 12. Wettability relates to the relative affinity of a fluid for the surface of a solid. Wettability may be measured by the contact angle between the fluid and the surface of the solid. The contact angle is determined by the difference in surface tension between the fluid and the solid at the fluid-solid boundary. For example, a high difference in surface tension can indicate hydrophobic properties.

Each display element 2 includes a first electrode 17 as part of the support plate 5. In examples shown there is one such electrode 17 per element; in other examples there may be more than one electrode per display element. The electrode 17 is electrically insulated from the first and second fluids by the insulating layer 13; electrodes of neighbouring display elements are separated by a nonconducting layer. In some examples, further layers may be arranged between the insulating layer 13 and the electrode 17. The electrode 17 can be of any desired shape or form. The electrode 17 of a display element is supplied with voltage signals by a signal line 18, schematically indicated in the Figure.

The support plate 6 for example includes a second electrode 19, which may extend between walls of a display element or extend uninterruptedly over a plurality of display elements 2, as shown in the Figure. The electrode 19 is in electrical contact with the second fluid 12 and is common to all display elements. The electrodes 17 and 19 may be made of for example the transparent conductive material indium tin oxide (ITO). A second signal line 20 is connected to the electrode 19. Alternatively, the electrode may be arranged at a border of the support plates, where it is in electrical contact with the second fluid. This electrode may be common to all elements, when they are fluidly interconnected by and share the second fluid, uninterrupted by walls. The display element 2 can be controlled by a voltage V applied between the signal lines 18 and 20. The signal line 18 can be coupled to a matrix of control lines on the substrate 7a. The signal line 20 is coupled to a display driving system.

The first fluid 11 in this example is confined to one display element by walls 21 that follow the cross-section of the display element. The cross-section of a display element may have any shape; when the display elements are arranged in a matrix form, the cross-section is usually square or rectangular. Although the walls are shown as structures protruding from the insulating layer 13 and formed on a second surface of the insulating layer 13, they may instead be a surface layer of the support plate that repels the first fluid, such as a hydrophilic or less hydrophobic layer. The walls may extend from the first to the second support plate but may instead extend partly from the first support plate to the second support plate as shown in FIG. 1. The extent of the display element, indicated by the dashed lines 3 and 4, is defined by the centre of the walls 21. The area of the first surface of the insulating layer 13 between the walls of a display element, i.e. the first surface, indicated by the dashed lines 22 and 23, is called the display area 24, over which a display effect occurs. The area of the second surface on which the walls are formed may be referred to as the wall area. The display effect depends on an extent that the first and second fluids adjoin the surface defined by the display area, in dependence on the magnitude of the applied voltage V described above. The magnitude of the applied voltage V therefore determines the configuration of the first and second fluids within the electrowetting element. In other words, the display effect depends on the configuration of the first and second fluid in the display element, which configuration depends on the magnitude of the voltage applied to the electrodes of the display element. The display effect gives rise to a display state of the display element for an observer looking at the display device. When switching the electrowetting element from one fluid configuration to a different fluid configuration the extent of second fluid adjoining the display area surface may increase or decrease, with the extent of first fluid adjoining the display area surface decreasing or increasing, respectively.

In examples explained herein, the second fluid is reflective. In such an example, when a non-zero voltage is applied, the first and second fluids are configured such that the first fluid adjoins part of the first surface and the second fluid adjoins a different part of the first surface. In such an example, incident light $I_1$ on the viewing side passes through the support plate 5; where the second fluid adjoins the different part of the first surface, the incident light is reflected back through that different part by the second fluid adjoining the different part of the first surface; a reflected ray of such incident light is labelled $I_1$. Further, where for example a zero voltage is applied, or where first fluid adjoins part of the first surface 14 when a non-zero voltage is applied, incident light $I_2$ on the viewing side passes through the support plate 5 and, where the first fluid is transmissive, for example where the first fluid acts as a colour filter rather than a black absorber, passes also through first fluid adjoining the part of the first surface 14 and is then reflected by the second fluid and again passes through the first fluid before reaching the viewing side; a reflected ray of such incident light is labelled $I_2$. Thus, for examples with a configuration of the first and second fluids with the first fluid adjoining a part of the first surface, the second fluid is configurable to reflect light having passed through the first fluid adjoining the part of the surface, back through the first fluid adjoining the part of the surface. Depending on the composition of the second fluid, explained later, the second fluid may in examples reflect 80% or more of light incident on the second fluid.

Figure 2:
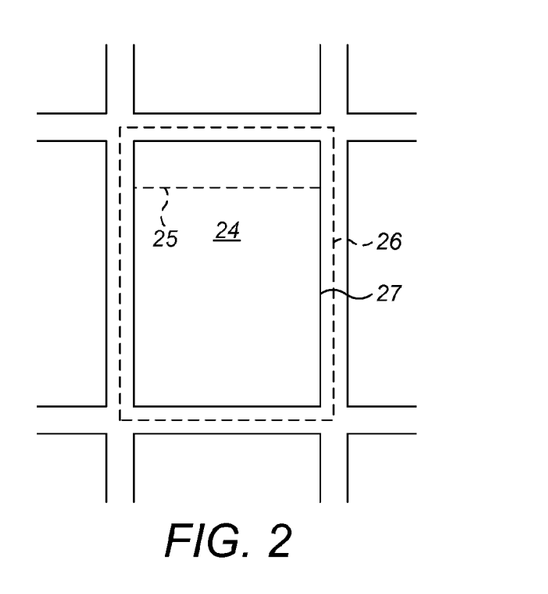
FIG. 2 shows a plan view of the example display element.

FIG. 2 shows a matrix of rectangular picture elements in a plan view of the hydrophobic first surface of the first support plate. The extent of the central picture element in FIG. 2, corresponding to the dashed lines 3 and 4 in FIG. 1, is indicated by the dashed line 26. Line 27 indicates the inner border of a wall; the line is also the edge of the display area 24.

When a zero or substantially zero voltage is applied between the electrodes 17 and 19, i.e. when the electrowetting element is in an off state, the first fluid 11 forms a layer between the walls 21, as shown in the FIG. 1. Application of a voltage will contract the first fluid, for example against a wall as shown by the dashed shape 25 in FIG. 1 or FIG. 2. The controllable shape of the first fluid, in dependence on the magnitude of applied voltage, is used to operate the picture element as a light valve, providing a display effect over the display area 24. For example, switching the fluids to increase adjoinment of the second fluid with the display area may increase the brightness of the display effect provided by the element.

This display effect determines the display state an observer will see when looking towards the viewing side of the display device. The display state can be from black to white with any intermediate grey state; in a colour display device, the display state may also include colour.

Examples of the second fluid will now be described in further detail. It is to be noted that such examples are not limited to the implementation of the second fluid described in specific examples above. The second fluid examples now described may be used in further envisaged examples of electrowetting elements, for example electrowetting display elements.

In examples of the second fluid, the second fluid is at least one of electrically conductive or polar and may be considered to be an electrolyte. "Electrically conductive" for example means that the second fluid is capable of conducting electricity; for example an electrical current may flow through the second fluid due to the flow of ions or electrons through the second fluid. "Polar" in examples means that the second fluid comprises at least one compound (for example a liquid vehicle) having a molecule with a net dipole; i.e. that across the molecular structure the molecule has an overall dipole moment, due to an electron distribution, with at least one part of the molecule having a negative electrical charge and at least one different part of the molecule having a positive electrical charge. Such dipole moments include permanent dipoles. The polarity is caused for example by the presence of one or more—atom to atom bond in the molecule, with for example one of the atoms being a heteroatom such as oxygen or nitrogen. For example, such a polar atom to atom bond is a bond between an oxygen (O) atom and a hydrogen (H) atom, i.e. an —O—H bond, which may be in some examples due to the presence of at least one hydroxyl (—OH) group. The presence of such bonds may cause hydrogen bonding between different molecules within the second fluid.

Figure 3:
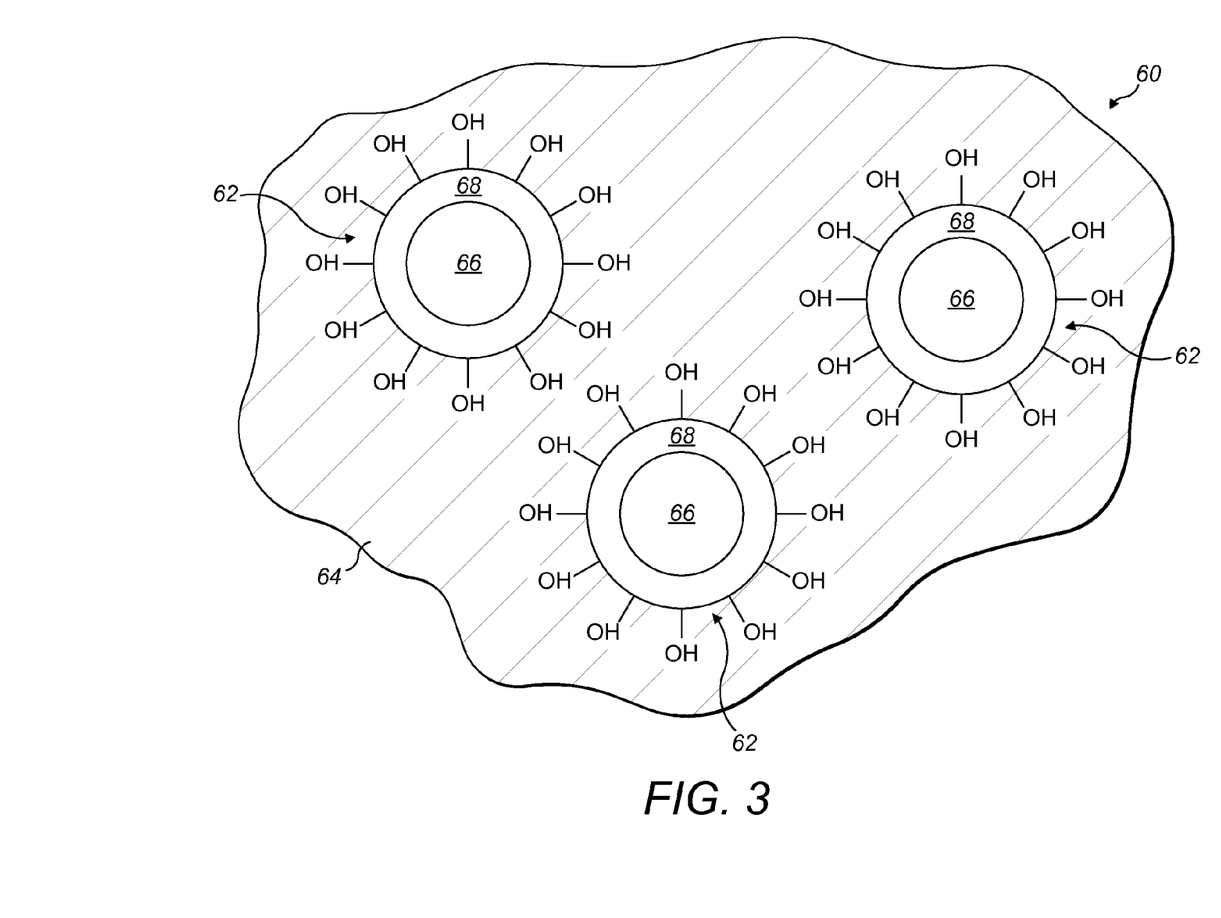
FIG. 3 shows schematically, in cross section, solid particles of part of a fluid according to examples.

With reference to FIG. 3, in examples, the second fluid 60 comprises a dispersion of a plurality of solid particles 62 in a liquid vehicle 64. "Solid" in examples indicates that the solid particles (and also the "solid" core described later) are of a solid phase state, i.e. order, of matter, in contrast to a liquid or a gas phase, for example. Therefore, in examples, a solid particle and/or solid core described herein may be a solid which is not necessarily rigid, for example the solid may be flexible or deformable, with or without resilient or elastic properties. A "liquid vehicle" in examples indicates a medium in which the solid particles are dispersed or suspended; in other words, the vehicle may be considered a carrier for the dispersion of solid particles. With the liquid vehicle being a liquid and therefore not a solid, the solid particles and liquid vehicle are of different phases. A dispersion in examples is a substantially homogeneous distribution of the solid particles in the liquid vehicle, for example where an average spacing between adjacent solid particles is approximately the same or is the same. In a dispersion, for example, the solid particles are suspended in the liquid vehicle and therefore in examples do not tend to settle to form a distinct layer of the solid particles separate from the liquid vehicle, at least for a desired duration for the intended use of the second fluid. In other words, during this duration, the solid particles remain distributed within the liquid vehicle. This duration may for example be in the order of months. A "particle" referred to in examples does not refer to an individual atom, but instead to a structure which has the formation of a solid particle described herein and which therefore is formed of numerous atoms; a particle may therefore in examples be considered a granule.

At least one of the solid particles 62, for example respective ones of the plurality of solid particles 62, each comprise a solid core 66 having a coating 68. Each, or in other examples some not all, for example a majority, of the plurality of solid particles may have such a structure with the solid core and coating described here.

In examples the solid core 66 lies at the centre of the solid particle and is at least partially surrounded, for example substantially fully surrounded (i.e. more than 90%, more than 95%, more than 97.5% or approximately fully surrounded, for example fully surrounded) by the coating 68. In some examples the coating 68 may be a film, a shell or a layer. It is to be noted that although in the examples illustrated in FIG. 3 the coating is directly in contact with an outer surface of the solid core, in other examples there may be at least one further layer between the solid core and the coating.

In the examples described herein, the coating comprises silicon dioxide. Therefore in some examples the coating is formed of silicon dioxide, i.e. $SiO_2$ (Si representing silicon and O representing oxygen). Silicon dioxide might otherwise be known as silica. In some examples the coating may be formed solely of silicon dioxide, but in other examples the coating may be formed partly of silicon dioxide and partly of other atoms, molecules or compounds than Si and O. For example, the material forming the coating is predominantly, i.e. more than 50% of the composition of the coating material is, formed of silicon dioxide. For example, in some examples, the silicon dioxide may be doped with atoms other than Si or O; for example, the silicon dioxide may have a structure which is porous to some extent, with pores being occupied with atoms or compounds other than Si or O. Such atoms or compounds may be used to control a charge or a pH or another property of the solid particles. The form of the silicon dioxide used in examples may depend on the specific properties desired; in some examples the silicon dioxide has a crystalline or partially crystalline form, whereas in other examples the silicon dioxide has an amorphous form. Solid particles in accordance with examples described herein may for example be obtained from mknano (a divison of M K Impex Corp., 6382 Lisgar Drive, Missisauga, ON L5N 6X1, Canada) and having product number MKN-TiO2-R050L) or from SkySpring Nanomaterials, Inc. (2935 Westhollow Drive, Houston, Tex. 77082, USA) and having product number 7921DL.

It has been found that such a coating comprising silicon dioxide provides a suitable dispersion of solid particles useful for an electrowetting device in a liquid vehicle for an electrowetting device. It is not trivial to identify suitable materials for use in a second fluid of an electrowetting device, due to the various parameters to satisfy, for example viscosity, switching performance, immiscibility with the first fluid, and electrical conductivity and/or polarity parameters. It is known to use surfactants in a liquid to aid dispersion of solid particles. However, in an electrowetting device using a surfactant can be undesirable as it may interfere with the electric field when a voltage is applied for switching a configuration of the fluids, thus negatively affecting the switching performance and therefore for example a display effect provided. It has now been found that instead of a surfactant, a silicon dioxide comprising coating of a solid particle provides suitable dispersion properties in a liquid vehicle which is suitable for an electrowetting device. Taking into account that selecting a suitable liquid vehicle for the second fluid also has to meet many technical parameters to ensure correct operation of the device, this realisation of using the coating comprising silicon dioxide is not trivial.

Moreover, the coating comprising silicon dioxide may act as a barrier between the liquid vehicle and the solid core of the solid particles, for protecting, i.e. shielding, the solid core material from the liquid vehicle, for example by providing a suitably chemically inert material between the solid core and the liquid vehicle. Therefore, for example, where the solid core material might react with at least one compound of the liquid vehicle, for example by a photo-oxidation process, the coating prevents or reduces this reaction occurring. In examples, this improves a useful lifetime of the solid particles and/or the stability of the dispersion.

In examples, where the liquid vehicle 64 comprises at least one compound having hydroxyl groups, for example compounds described later, for example a liquid with a high surface tension property, an exterior surface of the coating of at least one of the solid particles, for example respective ones of the solid particles, becomes hydroxylated (as shown as an example in FIG. 3). In other words, hydroxyl groups (—OH), for example hydroxyl ions (i.e. OH ions, where O is oxygen and H is hydrogen) from the liquid vehicle, bond, for example adsorb, to the exterior surface of the coating, specifically in examples to silicon atoms of the silicon dioxide. This can increase the surface energy of the solid particles, improving the dispersion of the particles in the liquid vehicle which for example has a high surface tension.

For example, the exterior surface of the coating may be hydrophilic. The number of the —OH groups from the liquid vehicle bonded to the surface of the coating may depend on the pH of the liquid vehicle. Thus, by controlling the pH, for example with the use of added ions to the liquid vehicle, the number of positive and/or negative charges on the surface of the solid particles can be tuned, to control the stability and/or homogeneity of the dispersion of the solid particles in the liquid vehicle. This dispersion mechanism (which is believed to be the case but is not to be taken as limiting in this description) has been found not to detrimentally interfere with the electric field when applying a voltage. Thus, in examples, interactions between at least one compound of the liquid vehicle having hydroxyl groups and a hydroxylated exterior surface of the coating of respective ones of the plurality of solid particles substantially maintains the dispersion of the plurality of solid particles in the liquid vehicle. Use of the term substantially for example indicates that the dispersion is maintained for an intended lifetime of the device including the second fluid or is maintained for the intended use and operating requirements of the second fluid.

In examples, the solid core of at least one, for example the respective ones of the plurality of solid particles comprises a pigment, which is an example of a colorant and which is for example a solid colorant such as a powdered solid which is substantially insoluble or insoluble in a liquid. A colorant is for example any material which influences a colour of a material including or being formed of the colorant. In other examples a different type of colorant is used, for example the solid particle may be at least partially porous and impregnated with a dye, or the solid particle may be fluorescent. A dye is for example a liquid or a colorant which has an affinity for the medium in which the dye is provided; for example, a dye may have an affinity for a liquid in which it is provided, so as to dissolve or mix with the liquid, i.e. the dye may be soluble in the liquid. In some examples, the solid core may be formed of a pigment material. A pigment in examples is a material which influences a colour of the solid core and in examples a colour of the solid particles too, therefore influencing a colour of the second fluid. The effect on colour by the pigment is caused by the pigment material's chemical properties for absorbing light of certain wavelengths compared with other wavelengths. For example, the pigment may be a white pigment for providing the second fluid with a white colour. A white colour is for example provided by a material which does not absorb a majority of wavelengths of light in the visible spectrum. For example, the pigment may not absorb 50%, 60%, 70%, 75%, 80%, 85%, 90%, 95%, 97.5%, 99%, approximately 100% or 100% of wavelengths of light in the visible spectrum. The visible spectrum in examples is the range of wavelengths between 390 and 700 nanometers. In other examples the pigment may absorb a sub-range of wavelengths of light in the visible spectrum, meaning the pigment gives a non-white colour to the second fluid.

In examples, the solid core of at least one, for example the respective ones of the plurality of solid particles, comprises a reflective material which for example reflects a greater portion of, i.e. more, light than a portion of the light which is at least one of absorbed or transmitted. For example, the portion of light absorbed and/or transmitted by the material may in total be 49% and the portion of light reflected may be 51% of the light. In examples the solid core may be formed of the reflective material. In examples a reflective material is a material which reflects, i.e. which does not absorb and/or transmit a proportion of, light. In examples, the reflective material reflects, i.e. is reflective for, a portion of more than 50% of light, for example of wavelengths of light, in the visible spectrum, for example more than: 50%, 60%, 70%, 75%, 80%, 85%, 90%, 95%, 97.5%, or 99%, or approximately 100% or 100% of light in the visible spectrum. With the plurality of solid particles being dispersed in the liquid vehicle, the reflective properties of the second fluid are in examples diffusive, i.e. a scattered or dispersive reflective effect occurs, rather than a specular reflective effect. This gives a more uniform distribution of light across a display element due to the reflecting, compared with a specular reflection. The reflectivity of the solid core may be selected to give a desired brightness of a display effect provide by the display element.

The reflective properties of the second fluid depend on a concentration of the plurality of solid particles which are dispersed in the liquid vehicle. A concentration is for example a quantity of solid particles within a given volume, for example a unit of volume, such as a liter, of the second fluid; in other words the quantity of the solid particles in a given volume of the liquid vehicle. The quantity may be specified in different manners and therefore a concentration may be specified in different manners. For example: a mass concentration (i.e. the mass of the solid particles in a given volume of the second fluid, divided by the given volume of the second fluid), a molar concentration (i.e. the amount of the solid particles measured in moles within a given volume, divided by the given volume of the second fluid), a number concentration (i.e. the number of the solid particles in a given volume of the second fluid, divided by the given volume of the second fluid), or a volume concentration (i.e. the volume of the second particles in a given volume of the second fluid, divided by the given volume of second fluid). Depending on the desired properties of the second fluid, a higher or lower concentration of the plurality of solid particles may be required. For example, for a particular switching performance of the second fluid, the total mass of solid particles per unit volume may be calculated for giving a particular rate of fluid switching, in dependence on the magnitude of applied voltage. In other examples, a particular density of solid particles in the second fluid may be required to give a desired fluid reflectance; a desired distance between adjacent of the solid particles in the second fluid may therefore be calculated for the desired reflectance, from which can be calculated the number of solid particles required in a unit volume of the second fluid.

For example, with a higher concentration, there may be a higher density of solid particles in a given volume of the second fluid, reducing the likelihood of light passing through the second fluid without encountering at least one of the solid particles. Thus, where for example the solid particles are white and/or reflecting, the second fluid has a greater reflectance compared with a lower concentration of solid particles. In examples, where a reflecting second fluid is desired, the second fluid has a concentration of the plurality of solid particles in the liquid vehicle for reflecting a majority of light in the visible spectrum which is incident on the second fluid. Therefore, in examples a majority, or a portion (for example more than: 50%, 60%, 70%, 75%, 80%, 85%, 90%, 95%, 97.5%, or 99%, or approximately 100% or 100%) of light, i.e. an intensity of light which is incident on the second fluid is reflected. It is noted that in further examples the concentration of solid particles in the liquid vehicle is selected such that a required dispersion of the solid particles is obtained, for example due to adjacent solid particles being sufficiently close in proximity to each other for the required dispersive effects to occur. In examples, the solid core of at least one of, for example of respective ones of, the plurality of solid particles comprises and may be partly or solely formed of one of or a mixture of at least one of titanium dioxide ($TiO_2$), barium titanate ($BaTiO_3$), antimony white (otherwise known as antimony trioxide and having the formula $Sb_2O_3$), barium sulphate ($BaSO_4$), basic lead carbonate ($2PbCO3.Pb(OH)_2$), or zinc oxide (ZnO). Any of these compounds, for example titanium dioxide, provide white and reflective properties in accordance with those described previously.

The coating of at least one, for example respective ones of the plurality of solid particles, is in examples substantially transmissive to light in the visible light spectrum which is incident on an exterior surface of the coating. Thus, the coating material may transmit more than for example 50%, 60%, 70%, 75%, 80%, 85%, 90%, 95%, 97.5%, 99%, approximately 100% or 100% of light in the visible spectrum. In this way, visible light can pass through the coating and interact with the underlying solid core material, for example to be efficiently reflected by the solid particles without excess undesired absorption of the light by the coating.

In examples, at least one of, for example respective ones of, the plurality of solid particles have a solid core with a maximum dimension which is, or is on average, in the range of approximately 50 to 300 nanometers, for example 50 to 300 nanometers or 100 to 200 nanometers. These sizes are found to be useful for the second fluid of an electrowetting display element; in accordance with the particular size of the solid particles being selected in dependence on the specific liquid vehicle and other parameters, for example the magnitude of voltage levels used for switching fluid configurations within an electrowetting display element. Particles which are too small may not provide the required reflectance whereas particles which are too large may inhibit fluid motion within a display element for example. Therefore, particle sizes may be used which provide suitable reflectance and/or are movable at a rate suitable for a desired fluid switching performance of the display element. The size examples given herein are found to meet these criteria, though the precise size selected will depend on the specific construction of the display element. A thickness of the coating of individual solid particles is for example taken in a radial direction from a centre point of the solid particle in question and is for example in the range of approximately 5 to 20%, for example 5 to 20% of the maximum dimension or the average dimension of the solid particle. In some examples the coating may have a thickness in the order of tens of nanometers, though may be thicker or thinner depending on the required properties of the solid particles. For example, the thickness is 4 nanometers or greater, as less than 4 nanometers may result in an outer surface of the solid particles exhibiting properties of the solid core material rather than the coating material. A shape of the solid core may be selected in dependence on desired properties of the solid particles. The second fluid may consist of between approximately 5 and 40 wt % (i.e. percentage by weight), for example 5 to 40 wt % of solid particles described in examples herein, to provide a sufficiently stable dispersion and a sufficient reflectivity.

In examples, the liquid vehicle comprises at least one of water, a polyether; a peroxide; a polyol such as a diol, a triol and/or a tetraol; an ether; dioxalane; dimethoxymethane; an amide; a polyamide; a carboxylic acid; formic acid; acetic acid; propanoic acid; glycolic acid; a heteroatom substituted carboxylic acid; a halogenated carboxylic acid; chloroacetic acid; trifluoroacetic acid; a dicarboxylic acid; oxalic acid; malonic acid; succinic acid; and/or glutaric acid; a tricarboxylic acid; citric acid; aconitic acid; an ester; methyl acetate; ethyl lactate; a sulphone; dimethyl sulphate; dimethyl sulphite; methylsulphonylmethane; an aldehyde; acetaldehyde; glyoxal; methylglyoxal; a peroxide; methyl ethyl ketone peroxide; oxamic acid; organosulphoxide; ethylene carbonate; propylene carbonate; diethylene glycol; polyethylene glycol; propylene glycol; erythritol; ethylene glycol; glycerol; butanetriol; derivatives thereof; or combinations thereof. A heteroatom in examples is for example a halogen atom such as chlorine (Cl), fluorine (F), bromine (Br), iodine (I), or nitrogen (N), sulphur (S), boron (B) or phosphorus (P).

In some examples, the liquid vehicle comprises a non-aqueous component selected from the group consisting of ethylene glycol; diethyleneglycol; polyethylene glycol; propylene glycol; dioxalane; glyoxal; citric acid; oxalic acid; oxamic acid; glycerol; or formic acid. In further examples, the liquid vehicle includes a different second non-aqueous component selected from the group consisting of erythritol; ethylene carbonate; propylene carbonate; ethylene glycol; glycerol; and butanetriol. In some such examples the non-aqueous components of the second liquid are ethylene glycol and ethylene carbonate, ethylene glycol and propylene carbonate, ethylene glycol and glycerol, diethylene glycol and glycerol, or polyethylene glycol and glycerol. Such examples of a liquid vehicle comprising two non-aqueous components offer suitable properties which, in combination with the chemical and physical properties of the solid particles, give a suitable dispersion of the solid particles in the liquid vehicle, with for example suitable switching properties for an electrowetting element and/or suitable reflective properties. In some such examples described above, the liquid vehicle comprises zero, approximately zero, or a hygroscopic amount of water, for example a maximum hygroscopic amount of water, in addition to the non-aqueous components. In other examples, the liquid vehicle comprises more than a hygroscopic amount of water, in addition to the non-aqueous components, for example the water content of the liquid vehicle of the second fluid is at least one of less than 35 wt %, 30 wt % or less, 15 wt % or less, 10 wt % or less, 5 wt % or less, 3 wt % or less, 1.5 wt % or less, 5 wt % or greater, 0.5 wt % or greater, 0.05 wt % or greater, for example 0.5 wt % to 15 wt %, or 0.05 wt % to 15 wt %, or 0.05 wt % to 1.5 wt %, or 0 to 0.5 wt %. In some such examples including water, the liquid vehicle has suitable properties in combination with the chemical and physical properties of the solid particles to provide suitable switching and/or reflective properties. Further details of examples of the second fluid composition are included herein by way of reference to PCT patent application no. PCT/EP2011/060114. Such examples of the liquid vehicle composition described are compatible with the solid particles described herein, to give a suitable dispersion within the liquid vehicle.

The above examples are to be understood as illustrative examples. Further examples are envisaged. For example, although examples are described above in relation to a display element, it is envisaged that examples of the second fluid described herein may be used in further examples where a different type of electrowetting element is used. For example, further examples are envisaged where, depending on the configuration of the first and second fluids in an electrowetting element, an extent of first fluid adjoining a surface of a display area (which surface for example is hydrophobic) depends on a magnitude of applied voltage; in some configurations the first fluid may not adjoin the surface, but in other configurations the first fluid can be configured to adjoin part of or all of the surface of the display area.

Figure 4:
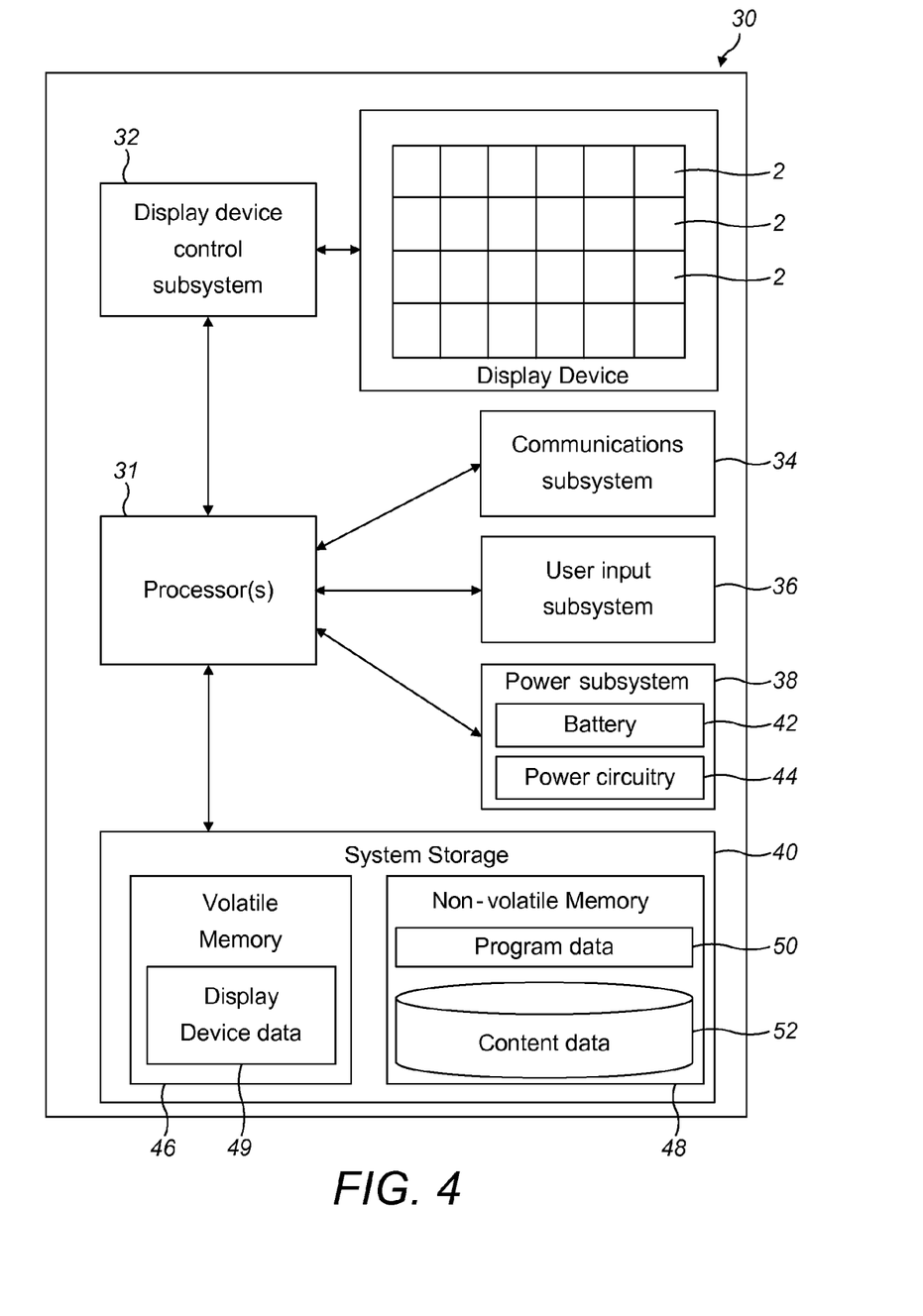
FIG. 4 shows a schematic system diagram of an example apparatus including an electrowetting display device.

FIG. 4 shows schematically a system diagram of an example system, for example apparatus 30, comprising an electrowetting display device such as the electrowetting display device 1 described above comprising electrowetting display elements 2. The apparatus is for example a portable, i.e. mobile, device such as an electronic reader device such as a so-called "e-reader", a tablet computing device, a laptop computing device, a mobile telecommunications device, a watch or a satellite navigation device; the apparatus may alternatively be a display screen for installation in any machine or device requiring a display screen, for example a consumer appliance.

The system diagram illustrates an example of a basic hardware architecture of the apparatus 30. The apparatus includes at least one processor 31 connected to and therefore in data communication with for example: a display device control subsystem 32, a communications subsystem 34, a user input subsystem 36, a power subsystem 38 and system storage 40. The display device control subsystem is connected to and is therefore in data communication with the display device 1. The at least one processor 31 is for example a general purpose processor, a microprocessor, a digital signal processor (DSP), an application specific integrated circuit (ASIC), a field programmable gate array (FPGA) or other programmable logic device, a discrete gate or transistor logic, discrete hardware components, or any suitable combination thereof designed to perform the functions described herein. A processor may also be implemented as a combination of computing devices, e.g., a combination of a DSP and a microprocessor, a plurality of microprocessors, one or more microprocessors in conjunction with a DSP core, or any other such configuration. The processor may be coupled, via one or more buses, to read information from or write information to one or more memories, for example those of the system storage 40. The at least one processor may additionally, or in the alternative, contain memory, such as processor registers.

The display device control subsystem 32 for example includes electrowetting display element driver components, for use in applying a voltage to any of the electrowetting display elements, to address different such display elements. In examples the electrowetting display elements are configured according to an active matrix configuration and the display device control subsystem is configured to control switching elements such as thin film transistors (TFTs) of the display device 1 via circuitry to control the electrowetting display elements. The circuitry may include signal and control lines such as those described above.

The communications subsystem 34 for example is configured for the apparatus to communicate with for example a computing device via a data network, for example a computer network such as the Internet, a local area network, a wide area network, a telecommunications network, a wired network, a wireless network, or some other type of network. The communications subsystem 34 may further for example comprise an input/output (I/O) interface, such as a universal serial bus (USB) connection, a Bluetooth or infrared connection, or a data network interface for connecting the apparatus to a data network such as any of those described above. Content data as described later may be transferred to the apparatus via the communications subsystem.

The user input subsystem 36 may include for example an input device for receiving input from a user of the apparatus. Example input devices include, but are not limited to, a keyboard, a rollerball, buttons, keys, switches, a pointing device, a mouse, a joystick, a remote control, an infrared detector, a voice recognition system, a bar code reader, a scanner, a video camera (possibly coupled with video processing software to, e.g., detect hand gestures or facial gestures), a motion detector, a microphone (possibly coupled to audio processing software to, e.g., detect voice commands), or other device capable of transmitting information from a user to the device. The input device may also take the form of a touch-screen associated with the display device, in which case a user responds to prompts on the display device by touch. The user may enter textual information through the input device such as the keyboard or the touch-screen.

The apparatus may also include a user output subsystem (not illustrated) including for example an output device for providing output to a user of the apparatus. Examples include, but are not limited to, a printing device, an audio output device including for example one or more speakers, headphones, earphones, alarms, or haptic output devices. The output device may be a connector port for connecting to one of the other output devices described, such as earphones.

The power subsystem 38 for example includes power circuitry 42 for use in transferring and controlling power consumed by the apparatus. The power may be provided by a mains electricity supply or from a battery 44, via the power circuitry. The power circuitry may further be used for charging the battery from a mains electricity supply.

The system storage 40 includes at least one memory, for example at least one of volatile memory 46 and non-volatile memory 48 and may comprise a non-transitory computer readable storage medium. The volatile memory may for example be a Random Access Memory (RAM). The non-volatile (NV) memory may for example be a solid state drive (SSD) such as Flash memory, or Read Only Memory (ROM). Further storage technologies may be used, for example magnetic, optical or tape media, compact disc (CD), digital versatile disc (DVD), Blu-ray or other data storage media. The volatile and/or non-volatile memory may be removable or non-removable.

Any of the memories may store data for controlling the apparatus, for example components or subsystems of the apparatus. Such data may for example be in the form of computer readable and/or executable instructions, i.e. computer program instructions. Therefore, the at least one memory and the computer program instructions may be configured to, with the at least one processor, control a display effect provided by the electrowetting display device.

In the example of FIG. 4, the volatile memory 46 stores for example display device data 49 which is indicative of display effects to be provided by the display device 1. The processor 31 may transmit data, based on the display device data, to the display device control subsystem 32 which in turn outputs signals to the display device for applying voltages to the display elements, for providing display effects from the display device. The non-volatile memory 48 stores for example program data 50 and/or content data 52. The program data is for example data representing computer executable instructions, for example in the form of computer software, for the apparatus to run applications or program modules for the apparatus or components or subsystems of the apparatus to perform certain functions or tasks, and/or for controlling components or subsystems of the apparatus. For example, application or program module data includes any of routines, programs, objects, components, data structures or similar. The content data is for example data representing content for example for a user; such content may represent any form of media, for example text, at least one image or a part thereof, at least one video or a part thereof, at least one sound or music or a part thereof. Data representing an image or a part thereof is for example representative of a display effect to be provided by at least one electrowetting element of the electrowetting display device. The content data may include data representing a library of content, for example a library of any of books, periodicals, newspapers, movies, videos, music, or podcasts, each of which may be represented by a collection of data which represents for example one book or one movie. Such a collection of data may include content data of one type, but may instead include a mixture of content data of different types, for example a movie may be represented by data including at least image data and sound data.

It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the accompanying claims.

What is claimed is:

1. An electrowetting element comprising:
   a first fluid;
   a second fluid immiscible with the first fluid, the second fluid being at least one of electrically conductive or polar,
   the second fluid comprising a dispersion of a plurality of solid particles in a liquid vehicle, with respective ones of the plurality of solid particles each comprising a solid core having a coating comprising silicon dioxide, wherein, disposed within the solid core of the respective ones of the plurality of solid particles, is a material which reflects a greater portion of light than a portion of light which is at least one of absorbed or transmitted by the material; and
   a first support plate comprising:
      an electrode, and
      a surface located between the electrode and the second fluid,
   a configuration of the first fluid and the second fluid depending on a magnitude of a voltage applied using the electrode, the first fluid and the second fluid switchable between at least:
   a first configuration with:
      the first fluid adjoining a first part of the surface, and
      the second fluid adjoining a second part of the surface different from the first part of the surface; and
   a second configuration with:
      the first fluid adjoining a third part of the surface smaller than the first part of the surface, and
      the second fluid adjoining a fourth part of the surface different from the third part of the surface and larger than the second part of the surface,
   the first configuration corresponding to a first display effect of the electrowetting element, and the second configuration corresponding to a second display effect of the electrowetting element.

2. The electrowetting element according to claim 1, wherein, disposed within the solid core of the respective ones of the plurality of solid particles is one or more of: a colorant, a pigment, or a dye.

3. The electrowetting element according to claim 1, wherein the material is reflective for a portion of more than 50% of light in the visible light spectrum.

4. The electrowetting element according to claim 1, wherein the second fluid comprises a concentration of the plurality of solid particles in the liquid vehicle for reflecting a majority of light in the visible spectrum which is incident on the second fluid.

5. The electrowetting element according to claim 1, wherein the solid core of the respective ones of the plurality of solid particles comprises at least one of: titanium dioxide, barium titanate, antimony white, barium sulphate, basic lead carbonate, or zinc oxide.

6. The electrowetting element according to claim 1, wherein the coating of the respective ones of the plurality of solid particles is substantially transmissive to light in the visible light spectrum.

7. The electrowetting element according to claim 1, the coating of the respective ones of the plurality of solid particles having a hydroxylated exterior surface, an interaction between at least one compound of the liquid vehicle and the hydroxylated exterior surface substantially maintaining the dispersion of the plurality of solid particles in the liquid vehicle.

8. The electrowetting element according to claim 1, wherein the respective ones of the plurality of solid particles independently have at least one of:
   a maximum dimension of approximately 50 to 300 nanometers,
   an average maximum dimension of approximately 50 to 300 nanometers,
   a maximum dimension of approximately 100 to 200 nanometers,
   an average maximum dimension of approximately 100 to 200 nanometers,
   a thickness of the coating of approximately 5 to 20% of the maximum dimension of the respective ones of the plurality of solid particles, or
   a thickness of the coating of approximately 5 to 20% of the average maximum dimension of the respective ones of the plurality of solid particles.

9. The electrowetting element according to claim 1, wherein the liquid vehicle comprises at least one of: water, a polyether; a peroxide; a polyol, a diol, a triol, a tetraol; an ether; dioxalane; dimethoxymethane; an amide; a polyamide; a carboxylic acid; formic acid; acetic acid; propanoic acid; glycolic acid; a heteroatom substituted carboxylic acid; a halogenated carboxylic acid; chloroacetic acid; trifluoroacetic acid; a dicarboxylic acid; oxalic acid; malonic acid; succinic acid; glutaric acid; a tricarboxylic acid; citric acid; aconitic acid; an ester; methyl acetate; ethyl lactate; a sulphone; dimethyl sulphate; dimethyl sulphite; methylsulphonylmethane; an aldehyde; acetaldehyde; glyoxal; methylglyoxal; a peroxide; methyl ethyl ketone peroxide; oxamic acid; organosulphoxide; ethylene carbonate; propylene carbonate; diethylene glycol; ethylene glycol; polyethylene glycol; propylene glycol; erythritol; glycerol; butanetriol; derivatives thereof; or combinations thereof.

10. The electrowetting element according to claim 1, wherein approximately 5 to 40 wt % of the second fluid consists of the plurality of solid particles.

11. The electrowetting element according to claim 1, the surface being more wettable for the first fluid than for the second fluid without a voltage being applied between the second fluid and the electrode; the electrowetting element comprising a second support plate, the first fluid and the second fluid located between the first support plate and the second support plate.

12. The electrowetting element according to claim 1, wherein in the first configuration the second fluid is configured to reflect light having passed through the second part of the surface back through the second part of the surface, and in the second configuration the second fluid is configured to reflect light having passed through the fourth part of the surface back through the fourth part of the surface.

13. The electrowetting element according to claim 1, wherein in the first configuration the second fluid is configured to reflect light having passed through the first fluid adjoining the first part of the surface back through the first fluid adjoining the first part of the surface, and in the second configuration the second fluid is configured to reflect light having passed through the first fluid adjoining the third part of the surface back through the first fluid adjoining the third part of the surface.

14. A fluid comprising a dispersion of a plurality of solid particles in a liquid vehicle, with respective ones of the plurality of solid particles each comprising a solid core having a coating comprising silicon dioxide, wherein, disposed within the solid core of the respective ones of the plurality of solid particles, is a material which reflects a greater portion of light than a portion of light which is at least one of absorbed or transmitted by the material, the fluid being at least one of electrically conductive or polar, and usable as a second fluid of an electrowetting element comprising:

a first fluid immiscible with the second fluid;
the second fluid; and
a first support plate comprising:
an electrode, and
a surface located between the electrode and the second fluid,
a configuration of the first fluid and the second fluid depending on a magnitude of a voltage applied using the electrode, the first fluid and the second fluid switchable between at least:
a first configuration with:
the first fluid adjoining a first part of the surface, and
the second fluid adjoining a second part of the surface different from the first part of the surface; and
a second configuration with:
the first fluid adjoining a third part of the surface smaller than the first part of the surface, and
the second fluid adjoining a fourth part of the surface different from the third part of the surface and larger than the second part of the surface,
the first configuration corresponding to a first display effect of the electrowetting element, and the second configuration corresponding to a second display effect of the electrowetting element.

15. The fluid according to claim 14, wherein, disposed within the solid core of the respective ones of the plurality of solid particles is one or more of: a colorant, a pigment, or a dye.

16. The fluid according to claim 14, wherein the second fluid comprises a concentration of the plurality of solid particles in the liquid vehicle for reflecting a majority of light in the visible spectrum incident on the second fluid.

17. The fluid according to claim 14, wherein the solid core of the respective ones of the plurality of solid particles comprises at least one of: titanium dioxide, barium titanate, antimony white, barium sulphate, basic lead carbonate, or zinc oxide.

18. The fluid according to claim 14, the coating of the respective ones of the plurality of solid particles having a hydroxylated exterior surface, wherein an interaction between at least one compound of the liquid vehicle and the hydroxylated exterior surface substantially maintains the dispersion of the plurality of solid particles in the liquid vehicle.

19. The fluid according to claim 14, wherein the respective ones of the plurality of solid particles independently have at least one of:

a maximum dimension of approximately 50 to 300 nanometers,
an average maximum dimension of approximately 50 to 300 nanometers,
a maximum dimension of approximately 100 to 200 nanometers,
an average maximum dimension of approximately 100 to 200 nanometers,
a thickness of the coating of approximately 5 to 20% of the maximum dimension of the respective ones of the plurality of solid particles, or
a thickness of the coating of approximately 5 to 20% of the average maximum dimension of the respective ones of the plurality of solid particles.

20. The fluid according to claim 14, wherein the liquid vehicle comprises at least one of: water, a polyether; a peroxide; a polyol, a diol, a triol, a tetraol; an ether; dioxalane; dimethoxymethane; an amide; a polyamide; a carboxylic acid; formic acid; acetic acid; propanoic acid; glycolic acid; a heteroatom substituted carboxylic acid; a halogenated carboxylic acid; chloroacetic acid; trifluoroacetic acid; a dicarboxylic acid; oxalic acid; malonic acid; succinic acid; glutaric acid; a tricarboxylic acid; citric acid; aconitic acid; an ester; methyl acetate; ethyl lactate; a sulphone; dimethyl sulphate; dimethyl sulphite; methylsulphonylmethane; an aldehyde; acetaldehyde; glyoxal; methylglyoxal; a peroxide; methyl ethyl ketone peroxide; oxamic acid; organosulphoxide; ethylene carbonate; propylene carbonate; diethylene glycol; ethylene glycol; polyethylene glycol; propylene glycol; erythritol; glycerol; butanetriol; derivatives thereof; or combinations thereof.

21. The fluid according to claim 14, wherein approximately 5 to 40 wt % of the second fluid consists of the plurality of solid particles.

* * * * *